United States Patent [19]

Shen

[11] Patent Number: 5,122,015
[45] Date of Patent: Jun. 16, 1992

[54] CONSTRUCTION ASSEMBLY

[76] Inventor: Chen J. Shen, No. 361, Lane 636, Sec. 3, Chang Hsin Rd., Ho Mei Chen, Changhua Hsien, Taiwan

[21] Appl. No.: 663,715

[22] Filed: Mar. 4, 1991

[51] Int. Cl.⁵ ...................... E02D 17/20; E02D 29/02
[52] U.S. Cl. ........................ 405/284; 52/590; 405/21; 405/30; 405/286
[58] Field of Search ............... 405/284, 285, 286, 272, 405/30, 29; 52/590

[56] References Cited

U.S. PATENT DOCUMENTS

| 851,408 | 4/1907 | Cunningham | 405/286 |
|---|---|---|---|
| 2,892,340 | 6/1959 | Fort | 405/286 X |
| 3,116,570 | 1/1964 | Torricelli | 52/590 X |
| 3,220,141 | 11/1965 | Goss | 52/590 X |
| 3,614,446 | 10/1971 | Leuthold | 52/590 X |
| 4,932,812 | 6/1990 | Schaaf | 405/286 X |

FOREIGN PATENT DOCUMENTS

| 119434 | 1/1945 | Australia | 52/590 |
|---|---|---|---|
| 18936 | 9/1928 | Netherlands | 52/590 |
| 79756 | 1/1919 | Switzerland | 52/590 |

*Primary Examiner*—Dennis L. Taylor
*Attorney, Agent, or Firm*—Dellett, Smith-Hill and Bedell

[57] ABSTRACT

A wall or a sea wall is formed by a number of female blocks and a number of male blocks which can be coupled together and which are parallelepiped. Each female block has a recess formed in the middle portion of the upper surface and in the lower surface so that a pair of flanges are formed on each side of each of the recesses. Each male block has a protrusion formed on each corner area. Two adjacent protrusions of two male blocks can be received in the recess of the female block so that the male blocks and the female blocks can be stably coupled together.

4 Claims, 8 Drawing Sheets

CONSTRUCTION ASSEMBLY

BACKGROUND OF THE INVENTION

1. Field of the Invention

The present invention relates to a construction, and more particularly to a construction assembly.

2. Description of the Prior Art

Packing blocks or tetrapots are usually stacked along sea shore and used as jetty or wave breaker or sea wall. The tetrapods are randomly disposed and they can not be connected or coupled together with one another so that the strength and the rigidity of the jetty or wave breaker or sea wall are bad.

The present invention has arisen to mitigate and/or obviate the afore-described disadvantages of the conventional tetrapods for jetty.

SUMMARY OF THE INVENTION

The primary objective of the present invention is to provide a construction assembly in which the blocks thereof can be stably connected and coupled together so that the construction assembly has high strength and high rigidity.

In accordance with one aspect of the invention, there is provided a construction assembly including a number of female blocks and a number of male blocks which can be coupled together so as to form a wall or a sea wall. Each female block has a recess formed in the middle portion of the upper surface and in the lower surface so that a pair of flanges are formed on each side of each of the recesses. Each male block has a protrusion formed on each corner area. Two adjacent protrusions of two male blocks can be received in the recess of the female block so that the male blocks and the female blocks can be stably coupled together.

In accordance with another aspect of the invention, there is provided a construction assembly including a number of blocks which can be coupled together. Each block has a protrusion formed on each corner area. An opening is formed in a middle portion of each block. The opening is arranged such that four adjacent protrusions of four adjacent blocks can be engaged therin so that the blocks can be stably coupled together.

Further objectives and advantages of the present invention will become apparent from a careful reading of the detailed description provided hereinbelow, with appropriate reference to the accompanying drawings.

DETAILED DESCRIPTION OF THE INVENTION

Figure 1:
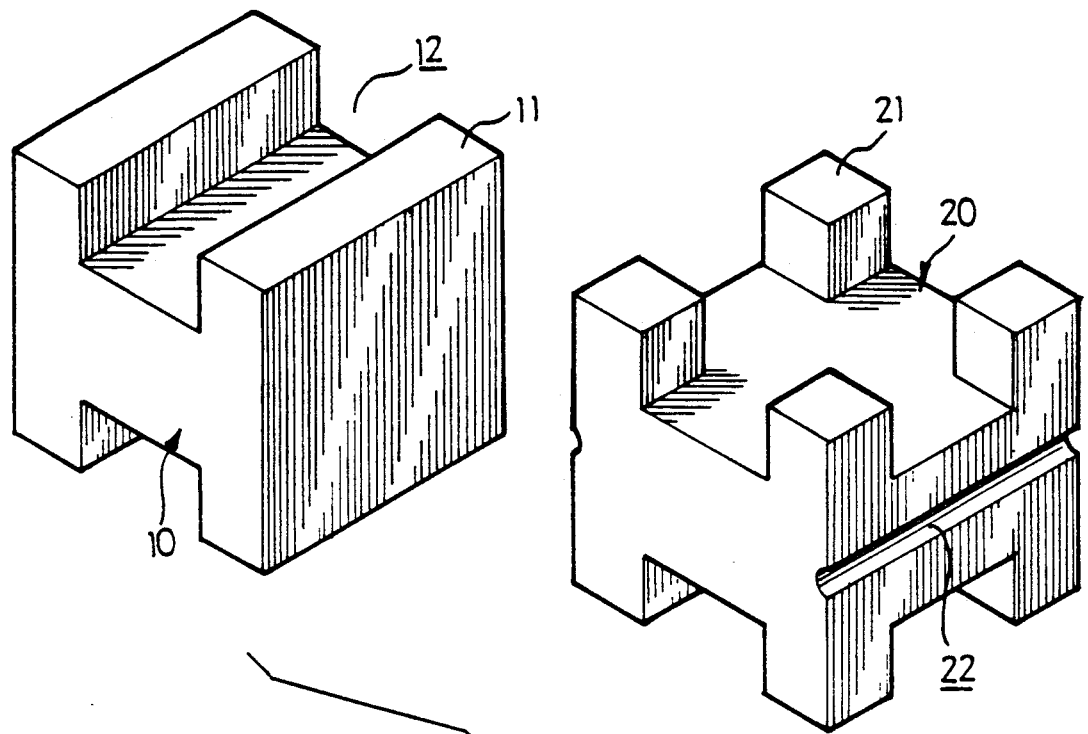
FIG. 1 is an exploded view illustrating one embodiment of the present invention.

Referring to the drawings and initially to FIGS. 1 to 4, a construction assembly in accordance with the present invention comprises generally a plurality of female blocks 10 and a plurality of male blocks 20 which can be mounded or piled or stacked or coupled together to form a wall or a jetty or a sea wall.

The female block 10 which is parallelepiped has a recess 12 formed in both the upper surface and the lower surface thereof so that two flanges 11 are formed on both sides of each of the recesses 12. A protrusion 21 is integrally formed on each of the corner areas of the upper surface and the lower surface of the male block 20. A groove 22 which has a semi-circular cross section is formed in each side of the male block 20. The protrusions 21 of the male blocks 20 can be engaged within the recesses 12 of the female blocks 10 and the flanges 11 of two adjacent female blocks 10 can be engaged between the protrusions 21 of the male block 20 so that the female blocks 10 and male blocks 20 can be stably coupled together. A circular groove which is formed by two adjacent grooves 22 of two adjacent male blocks 20 is provided as a water passage.

Figure 5:
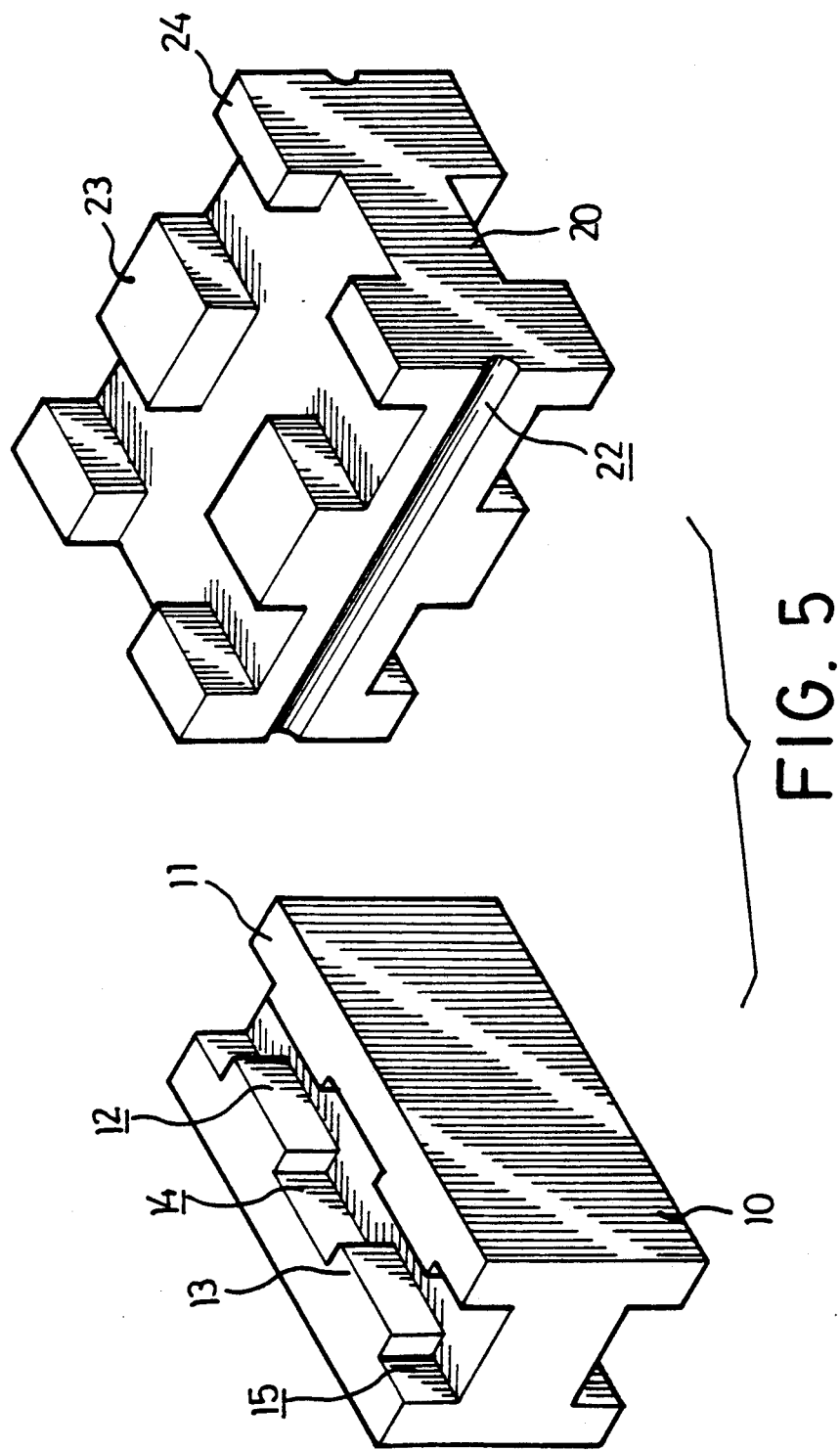
FIG. 5 is an exploded view similar to FIG. 1 illustrating another embodiment of the invention.
Figure 6:
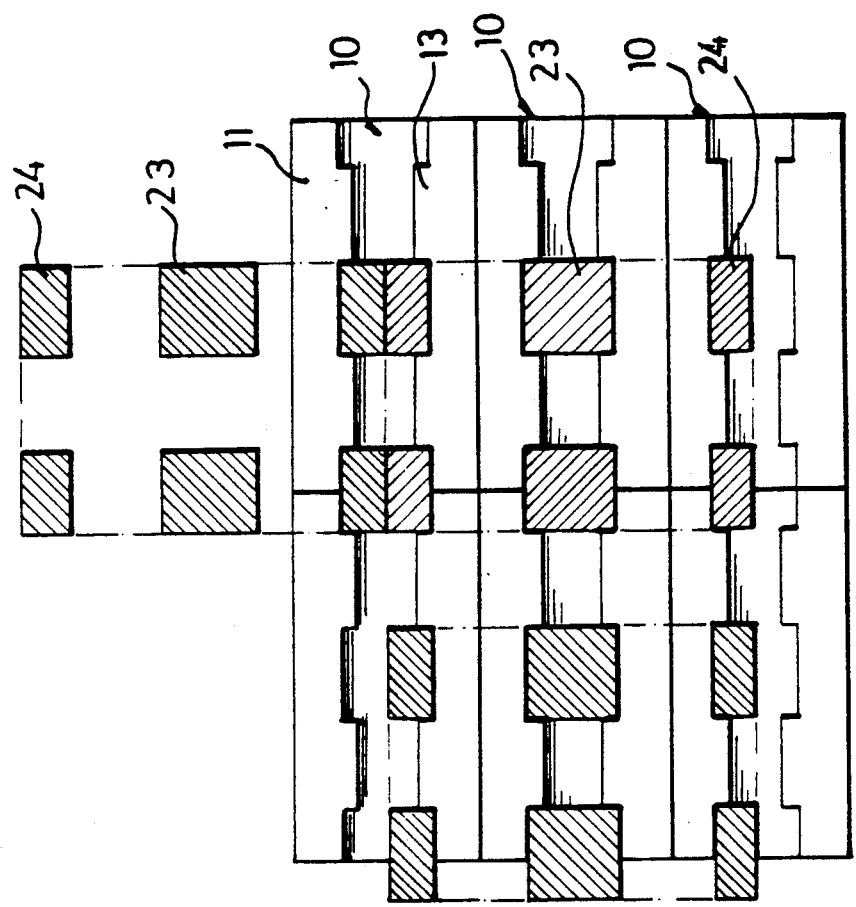
FIG. 6 is a schematic view of the construction assembly as shown in FIG. 5.

Referring next to FIGS. 5 and 6, the female block 10 and the male block 20 are rectangular parallelepiped. Two stops 13 are formed on each side of the recess 12 so that a square notch 14 is formed in the middle portion of the recess 12 and a rectangular notch 15 is formed in each end of the recess 12, in which the cross sectional area of the rectangular notch 15 equals to half of that of the square notch 14. A square protrusion 23 which has an area equal to that of the square notch 14 and two rectangular protrusions 24 which have an area equal to that of the rectangular notches 15 are formed on each side of the upper surface and the lower surface of the male block 20. A square protrusion 23 or two adjacent rectangular protrusions 24 can be received or engaged within a square notch 14 or a square notch formed by two adjacent rectangular notches 15 of two adjacent female blocks 10 so that the female blocks 10 and the male blocks 20 can be stably coupled together.

Figure 7:
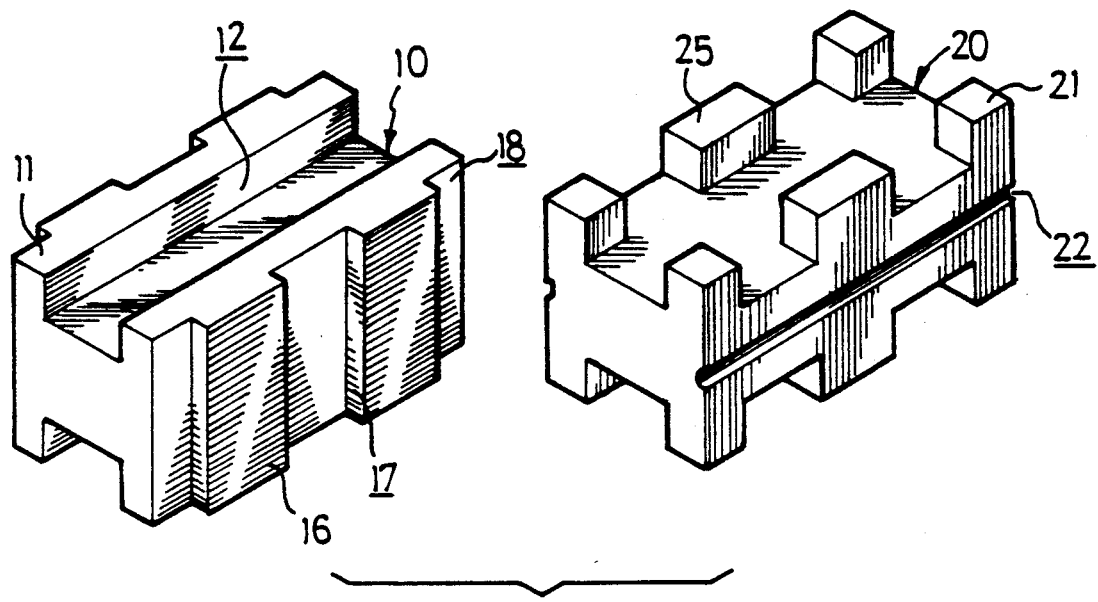
FIGS. 7 and 8 are schematic views similar to FIGS. 5 and 6, illustrating still another embodiment of the invention.
Figure 8:
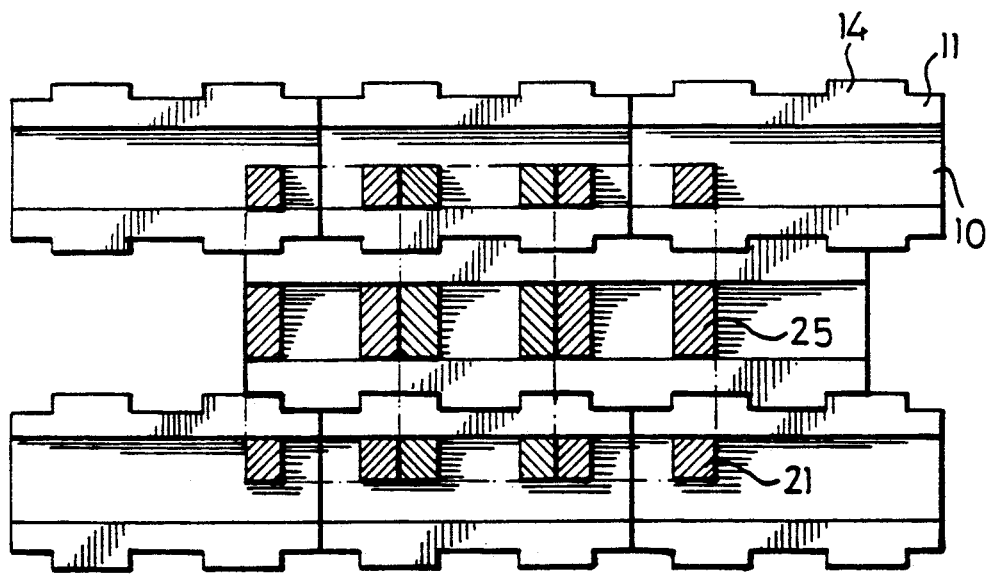

Referring next to FIGS. 7 and 8, the female block 10 and the male block 20 are similar to that shown in FIGS. 5 and 6. Two ribs 16 are formed on each side of the female block 10. A channel 17 is formed between the ribs 16 and a channel 18 is formed in each outer side of the ribs 16. The channel 17 has a cross sectional area equal to that of the ribs 16 and equal to that of two adjacent channels 18 so that the rib 16 can be engaged within either the channel 17 or two adjacent channels 18 and so that the female blocks 10 can be coupled together with one another. Two protrusions 25 are formed on the middle portion of the male block 20 and are disposed between the protrusions 21. The protrusions 25 and two adjacent protrusions 21 can be engaged within the recess 12 of the female block 10 so that the female blocks 10 and the male blocks 20 can be stably coupled together.

Figure 9:
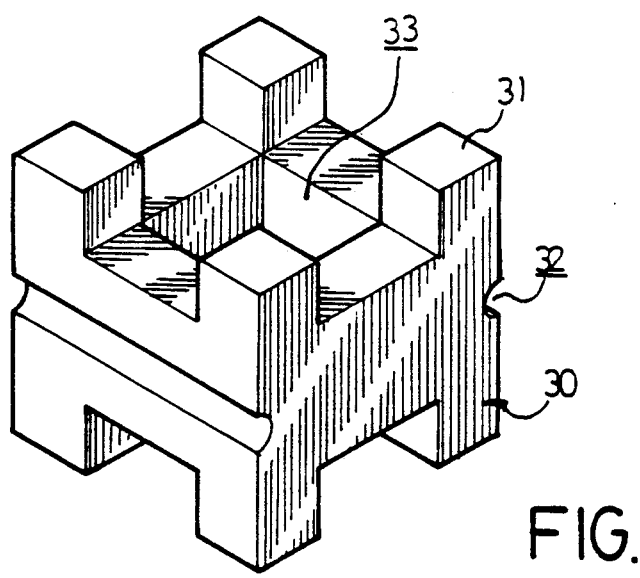
FIGS. 9 and 10 are perspective views illustrating two further embodiments of the invention.
Figure 2:
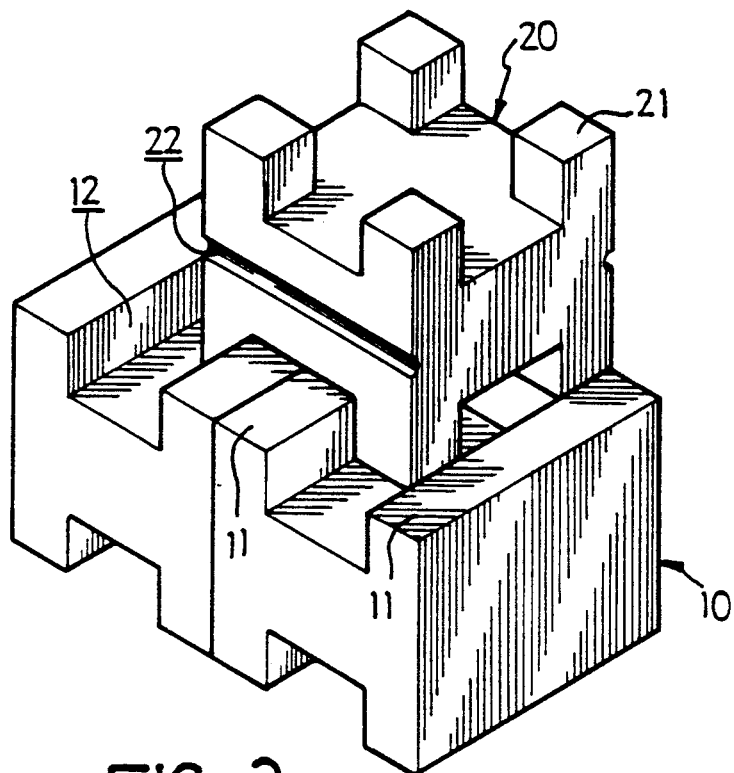
FIG. 2 is a perspective view of the construction assembly in which the blocks thereof are mounded or piled or coupled together.
Figure 3:
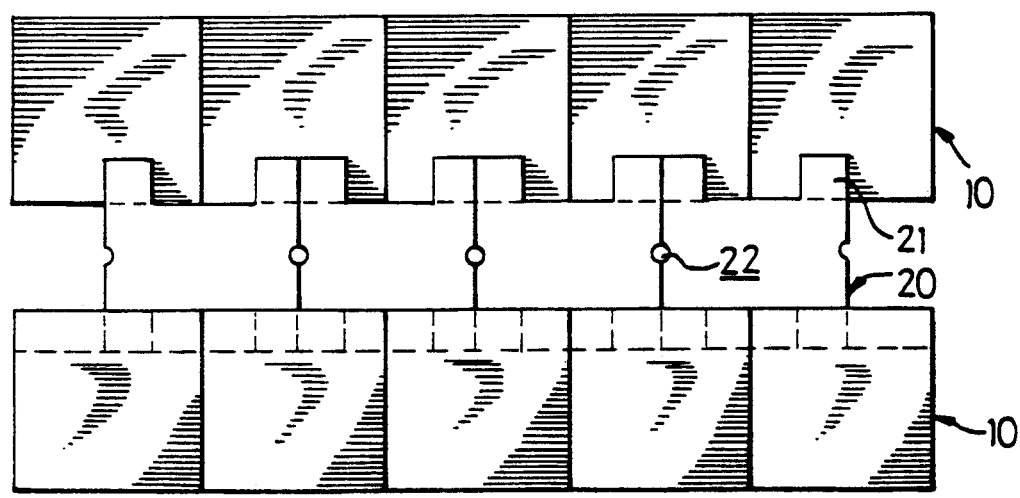
FIG. 3 is a plane view of the construction assembly.
Figure 4:
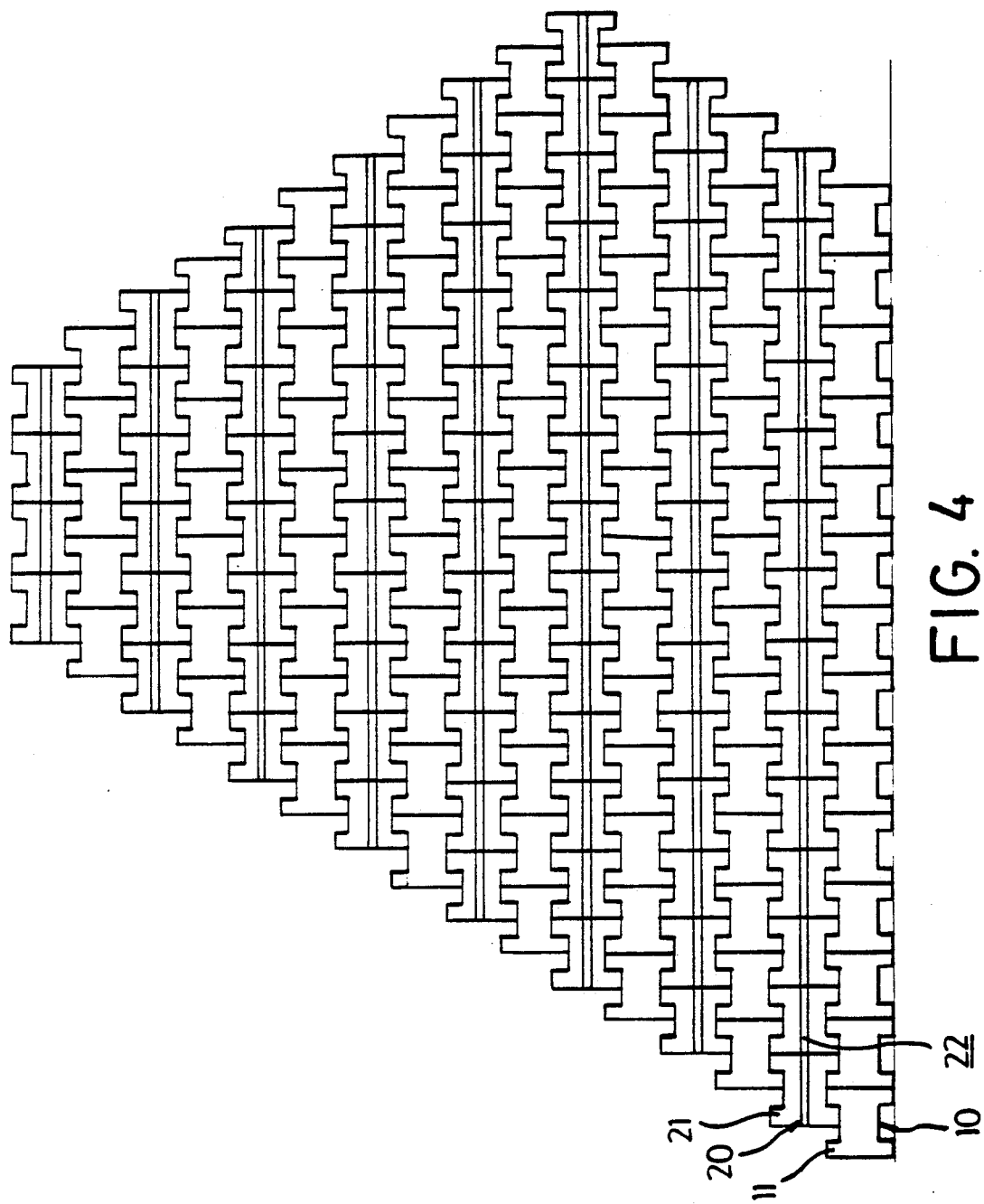
FIG. 4 is a schematic view illustrating a wall or a jetty mounded with a plurality of blocks.
Figure 10:
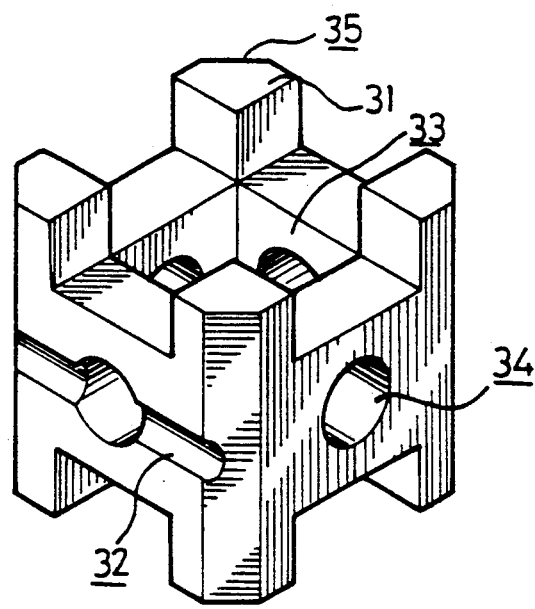
Figure 11:
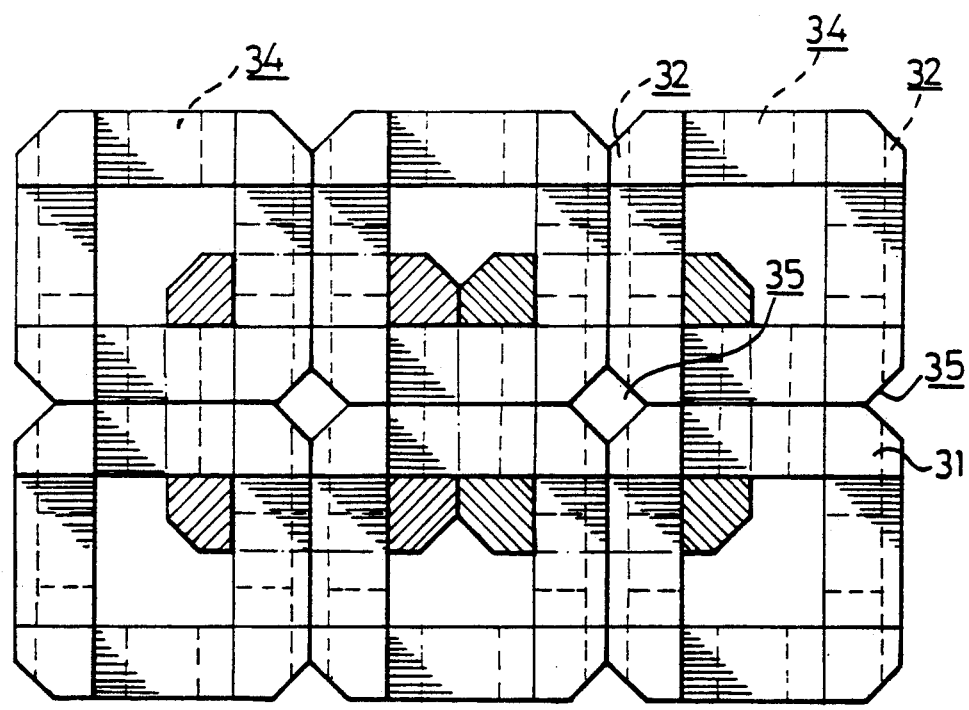
FIGS. 11 and 12 are schematic views of the construction assembly as shown in FIG. 10.

Referring next to FIGS. 9, 10 and 11, illustrated are two further similar embodiments of the invention. The block 30 is similar to the male block 20 as shown in FIG. 1 and also includes protrusions 31 formed on the corner areas and grooves 32 formed on two sides thereof. In addition, an opening 33 is formed through the center portion of the block 30. As shown in FIG. 10, each of the four vertical edges of the block 30 has a cut off portion 35 and a hole 34 is formed in each side of the block 34. The opening 33 has a size large enough for receiving four protrusions 31 of four adjacent blocks 30, and the cut off portions 35 of these four adjacent blocks 30 form a water passage. The holes 34 and the grooves 32 also form a number of water passages.

Figure 12:
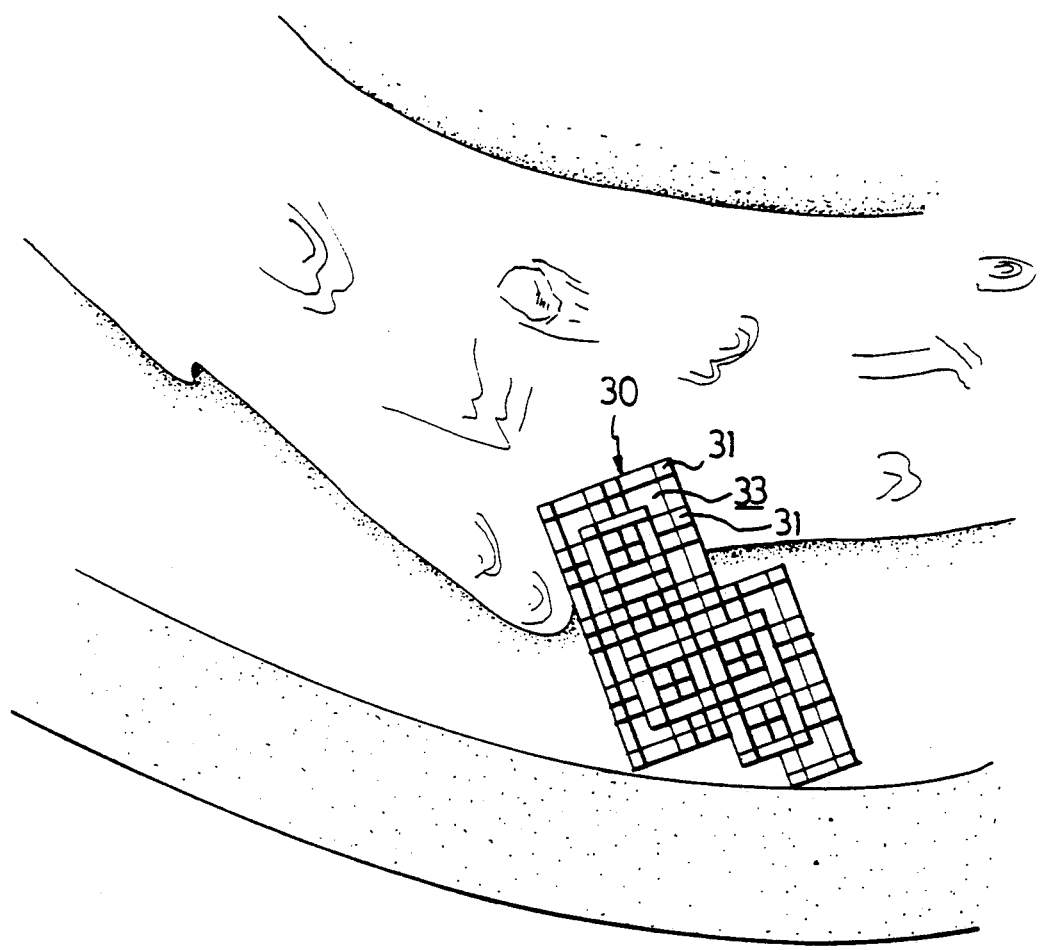

Referring next to FIG. 12, when a plurality of blocks 30 are stacked or coupled together, a sea wall or a jetty or a wave breaker which is formed by the blocks 30 and which has higher strength and higher rigidity is thus formed.

Accordingly, a wall or a sea wall or a jetty formed by the construction assembly in accordance with the present invention has higher strength and higher rigidity.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A construction assembly comprising a plurality of female blocks and a plurality of male blocks which can be coupled together and which are substantially parallelepiped, each of said female blocks having a recess formed in a middle portion of an upper surface and in a lower surface thereof respectively so that a pair of flanges are formed on each side of each of said recesses; each of said male blocks having a first protrusion formed on each of the corner areas thereof and having a groove formed in two opposite sides thereof; said groove of one of said male blocks being aligned with said groove of another said male blocks when said male blocks are disposed side by side so that a water passage is formed by said two aligned grooves, water may flow into said water passage when said construction assembly is disposed as a jetty so that the water pressure act on said construction assembly can be dissipated by said construction assembly, said recess of said female block being arranged such that two adjacent first protrusions of two adjacent male blocks can be received and engaged therein and two adjacent flanges of two adjacent female blocks can be engaged between said first protrusions, so that said male blocks and said female blocks can be stably coupled together, a pair of ribs formed on each side of said female blocks, a first channel formed between said ribs, a second channel formed in each outer side of said ribs, said first channel having a size equal to twice of said second channel, said ribs being received in said first channels or received in two adjacent second channels so that said female blocks can be stably coupled together.

2. A construction assembly comprising a plurality of female blocks and a plurality of male blocks which can be coupled together and which are substantially parallelepiped, each of said female blocks having a recess formed in a middle portion of an upper surface and in a lower surface thereof respectively so that a pair of flanges are formed on each side of each of said recesses; each of said male blocks having a first protrusion formed on each of the corner areas thereof and having a groove formed in two opposite sides thereof; said groove of one of said male blocks being aligned with said groove of the other male blocks when said male blocks are disposed side by side so that a water passage is formed by said two aligned grooves, water may flow into said water passage when said construction assembly is disposed as a jetty so that the water pressure act on said construction assembly can be dissipated by said construction assembly, said recess of said female block being arranged such that two adjacent first protrusions of two adjacent male blocks can be received and engaged therein and two adjacent flanges of two adjacent female blocks can be engaged between said first protrusions, so that said male blocks and said female blocks can be stably coupled together, a pair of ribs formed on each side of said female blocks, a first channel formed between said ribs, a second channel formed in each outer side of said ribs, said first channel having a size equal to twice of said second channel, said ribs being received in said first channels or received in two adjacent second channels so that said female blocks can be stably coupled together, a pair of second protrusions oppositely formed in a middle portion of said upper surface and said lower surface of said male block respectively and located between said first protrusions respectively, said second protrusions having a size equal to twice of said first protrusions, said second protrusion and two adjacent first protrusions being engaged within said recess so that said female blocks and said male blocks can be stably coupled together.

3. A construction assembly according to claim 2, wherein two stops are formed on each side of each of said recesses so that a first notch is formed in a middle portion of said recess and a second notch is formed in each end of said recess, said first notch has a size equal to twice of said second notch, said second protrusions can be engaged within said first notch and can be engaged within two adjacent second notches of two adjacent female blocks, two adjacent first protrusions can be engaged within said first notch and can be engaged within two adjacent second notches of two adjacent female blocks so that said female blocks and said male blocks can be stably coupled together.

4. A construction assembly comprising a plurality of blocks which can be coupled together and which are substantially parallelepiped, each of said blocks having a protrusion formed on each of the corner areas thereof, an opening being formed in a middle portion of each of said blocks, said opening being arranged such that four adjacent protrusions of four adjacent blocks can be received and engaged therein so that said blocks can be stably coupled together, a groove formed in two opposite sides of each of said blocks, said groove of one of said blocks being aligned with said groove of another said block when said blocks are disposed side by side so that a first water passage is formed by said two aligned grooves, each of said blocks having four vertical edges, each of said vertical edge having a cut off portion, said cut off portions of four adjacent vertical edges of four adjacent blocks forming a second water passage, and a hole formed in each side of said block, said hole being communicated with said first water passage and said second water passage, water may flow into said first and said second water passages when said construction assembly is disposed as a jetty so that the water pressure act on said construction assembly can be dissipated by said construction assembly.

* * * * *